Aug. 26, 1941.　　　F. LUENZ　　　2,253,910
GUM MASSAGE IMPLEMENT
Filed Aug. 27, 1938
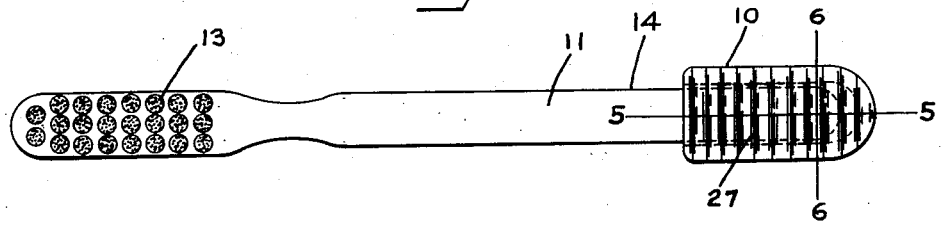
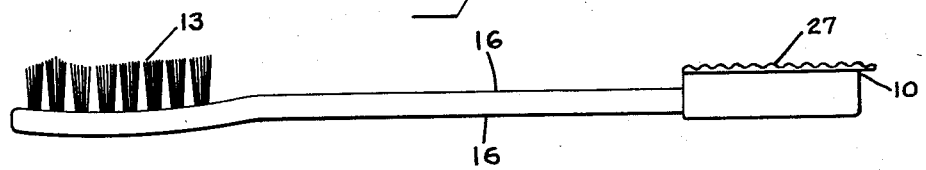
 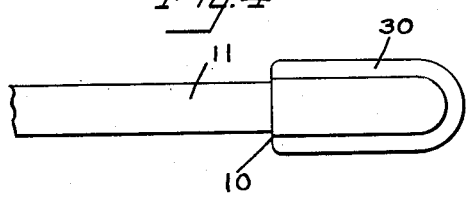
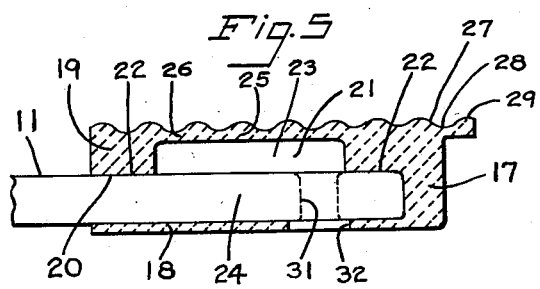 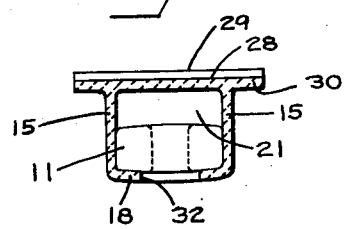
Inventor,
Franz Luenz,
Louis M. Schmidt,
Atty.

Patented Aug. 26, 1941

2,253,910

UNITED STATES PATENT OFFICE 2,253,910

GUM MASSAGE IMPLEMENT

Franz Luenz, Hartford, Conn.

Application August 27, 1938, Serial No. 227,202

1 Claim. (Cl. 128—62)

My invention relates to improvements in gum massage implements of the form that is used to massage the gums when manipulated generally after the manner of a tooth-brush, though differing in detail in order to obtain the most beneficial results and the object of my improved gum massage implement is to produce a device that is constructed and arranged so as to produce a superior and effective result under conditions of use, that is made of material that has yielding characteristics, rubber having such characteristics being one such material and others are known, the implement for support and manipulation being slipped onto one end of a rigid structure, such as the handle end of a tooth-brush, the detail of the massaging face to be described providing an important element in the efficiency obtainable.

In the accompanying drawing:

Figure 1 is a plan view of my improved massage implement as applied to one end of a tooth-brush.

Fig. 2 is a side elevation of the same.

Fig. 3 is an end elevation of the same.

Fig. 4 is a bottom view of the same.

Fig. 5 is a sectional view on an enlarged scale on the line 5—5 of Fig. 1.

Fig. 6 is a sectional view on the line 6—6 of Fig. 1.

My improved gum massage implement in one of the operative forms is made of soft rubber and said implement 10 is adapted to be slipped onto a suitable support, such as the handle end 11 of a tooth-brush. The over-all length may correspond more or less closely to that of the bristle element 13 of the tooth-brush.

Laterally the implement 10 extends beyond the edges 14 of the support to the extent of the thickness of the respective side walls 15, said support 11 being flat, the top and bottom faces 16 being appreciably wider than the thickness at the edges 14. The free end is closed by the end wall 17. The bottom wall 18 may be relatively thin.

At the inner end the end wall 19 has an opening 20 for admitting the support 11. Said opening 20 or mouth opens inwardly to a chamber or cavity that extends from said inner end wall 19 for almost but not quite the full length of the structure up to the outer end wall 17.

The walls of the chamber or cavity 21 along the bottom 18 and the edges 15 fit snugly to the support 11, responsive to a tight fit and yielding of the material, such as rubber or the like. At the upper side of the support 11 such fit is confined to the ends, such as the end contacting portions 22. The side walls 15 may be relatively thin, like the bottom 18. On the upper side, above the end contacting portions 22, there is appreciable thickness or body, which body, however is confined at the two ends to a relatively short length longitudinally. What is attained by the details described is that the chamber or cavity 21 comprises a portion 23 above the support-receiving portion 24 that serves as a yielding space for a portion of the top wall 25.

That is to say, the interior below the top wall 25 for the major portion of the length is hollow. The portion 26 of the top wall between the end walls and above the chamber or cavity is relatively thin, and thus is adapted to yield under conditions of use, as in massaging the gums.

The top face 27 of the top wall 25 is of special form, being transversely grooved or corrugated or serrated, comprising a series of grooves 28 bordered by ridges 29.

The top face mentioned is made wider than the width of the structure generally by the provision of overhanging supporting flanges 30 at the sides and which flanges are relatively thin and flexible.

Hanging-up means may be provided in registration with the opening 31 in the support 11 in the form of a device 32 in the bottom wall 18, which may be in the form of an extra large hole or a slot 32, as shown, precision in registration being thus avoided.

Although I have described in specific detail one embodiment of my invention, it will be evident to those skilled in the art that the invention can be variously modified and adapted within the scope of the appended claim.

I claim as my invention:

A gum massage implement in the form of a one-piece structure of soft rubber having top, bottom, two side, and two end walls, the top wall having a roughened top face for contacting with the gums under conditions of use, the side walls at the sides having appreciable downward depth and connecting with the bottom wall, the end walls serving as closures for the ends with one thereof punctured for the admission of a handle therethrough and located just above the bottom, the other end wall having a socket in registration with the puncture to receive the tip end of the handle, all walls cooperating to enclose an interior open space that is fully closed with the handle in place and that is fully open in the space between the top face of the handle and the top wall.

FRANZ LUENZ.